United States Patent
Khafagy et al.

(10) Patent No.: US 10,442,290 B2
(45) Date of Patent: Oct. 15, 2019

(54) CHARGE PORT COVERING ASSEMBLY AND COVERING METHOD

(71) Applicant: Ford Global Technologies, LLC, Dearborn, MI (US)

(72) Inventors: Hafiz Shafeek Khafagy, Dearborn, MI (US); Julie D'Annunzio, Livonia, MI (US); Mahmud Salam, Dearborn, MI (US); Maria Guido, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 15/656,167

(22) Filed: Jul. 21, 2017

(65) Prior Publication Data

US 2019/0023126 A1 Jan. 24, 2019

(51) Int. Cl.
*B60K 15/05* (2006.01)
*E06B 3/38* (2006.01)

(52) U.S. Cl.
CPC ............... *B60K 15/05* (2013.01); *E06B 3/38* (2013.01); *B60K 2015/0569* (2013.01)

(58) Field of Classification Search
CPC ............. B60K 15/05; B60K 2015/053; B60K 15/0538
USPC .................................................. 296/97.22
See application file for complete search history.

(56) References Cited

U.S. PATENT DOCUMENTS

| 6,499,789 | B2 | 12/2002 | Moll et al. | |
|---|---|---|---|---|
| 2013/0089999 | A1* | 4/2013 | Martin | H01R 13/6395 439/345 |
| 2013/0326955 | A1* | 12/2013 | Kotama | B60L 11/1818 49/13 |
| 2015/0102627 | A1* | 4/2015 | Pickartz | B60L 11/1818 296/97.22 |
| 2015/0183331 | A1* | 7/2015 | Yamamaru | B60K 15/05 701/22 |

(Continued)

FOREIGN PATENT DOCUMENTS

| CN | 201149923 | 11/2008 |
|---|---|---|
| CN | 201423914 | 3/2010 |

(Continued)

OTHER PUBLICATIONS

Frew, Nicholas, 15 Amazing Facts About the Tesla Model S, Autosaur, retrieved from http://www.autosaur.com/15-amazing-facts-about-the-tesla-model-s/.

*Primary Examiner* — Jason S Morrow
(74) *Attorney, Agent, or Firm* — Carlson, Gaskey & Olds, P.C.

(57) ABSTRACT

An exemplary charge port covering assembly includes, among other things, a biasing device configured to move to a first position when a charger is decoupled from a charge port, and to a second position when the charger is coupled to the charge port. A charge port door is moveable to a closed position when the biasing device is in the first position, and is held in an open position when the biasing device is in the second position. An exemplary charge port covering method includes, among other things, biasing a charge port door toward an open position with a biasing device in a first position, and moving the biasing device from the first position to a second position to close the charge port door.

9 Claims, 3 Drawing Sheets

(56) References Cited

U.S. PATENT DOCUMENTS

2015/0191093 A1* 7/2015 Yamamaru ............ B60L 11/123
320/109
2016/0311341 A1* 10/2016 Nada ................... B60L 11/1896
2018/0215254 A1* 8/2018 Jobst ...................... B60K 15/05

FOREIGN PATENT DOCUMENTS

| CN | 202856411 | 4/2013 |
| CN | 206012746 | 3/2017 |

* cited by examiner

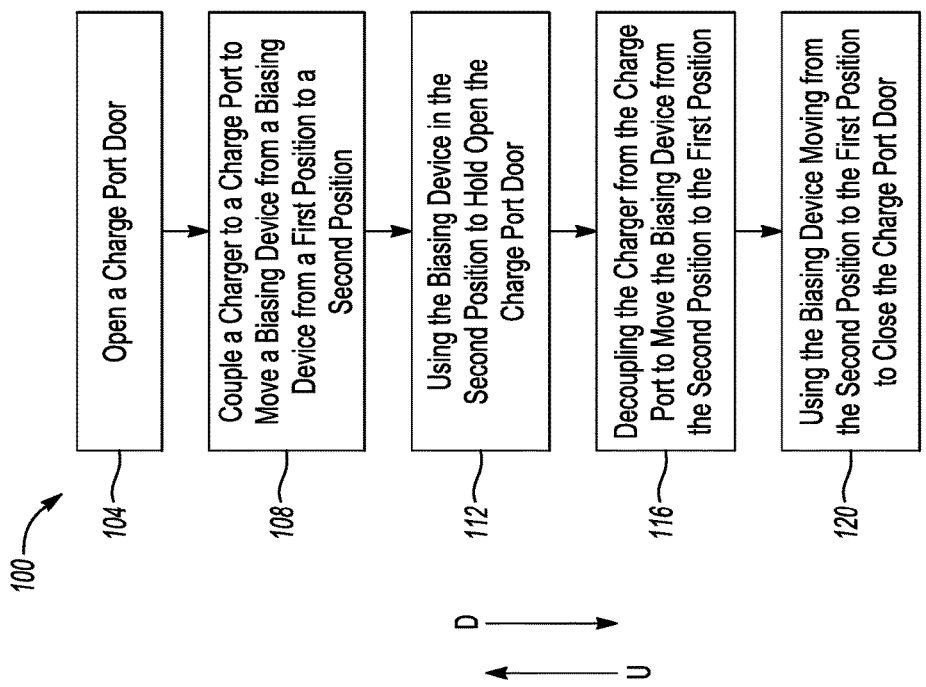
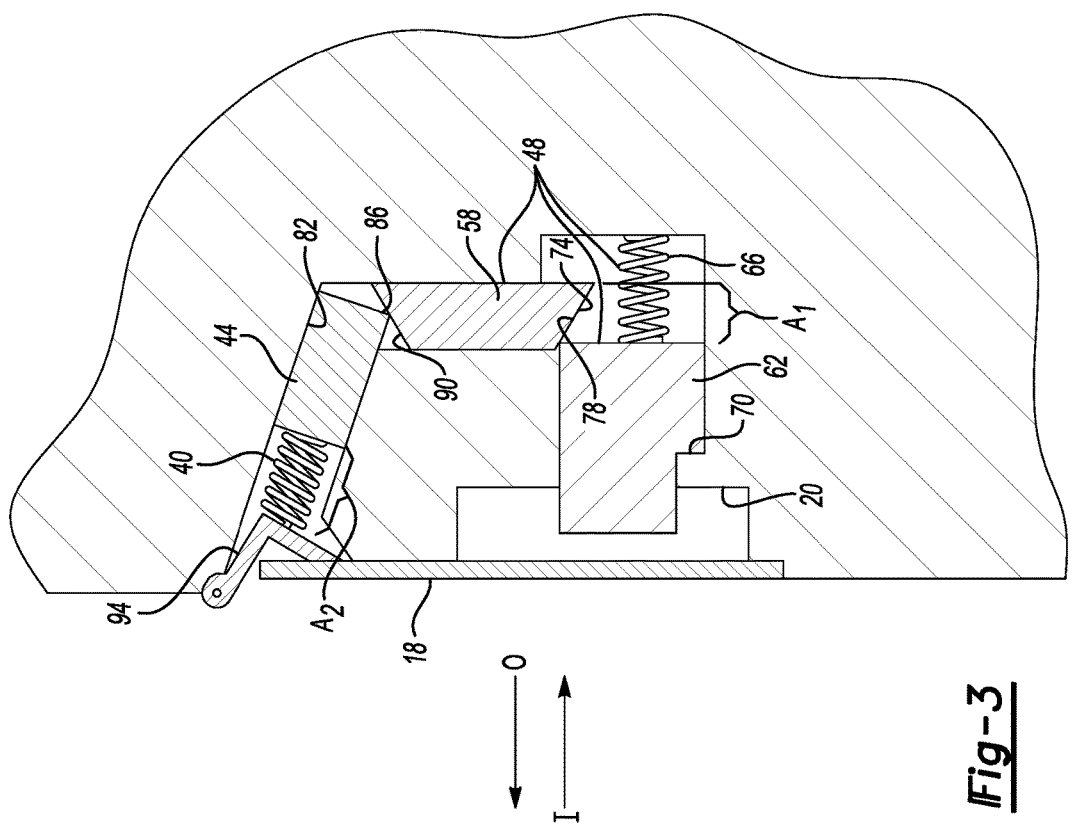

CHARGE PORT COVERING ASSEMBLY AND COVERING METHOD

TECHNICAL FIELD

This disclosure relates generally to covering a charge port of an electrified vehicle. In particular, the disclosure relates to a charge port door that automatically closes when a charger is decoupled from the charge port.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source, such as a grid source.

A charger can coupled to a charge port of the vehicle when charging the traction battery from the external power source. Some electrified vehicles include a charge port door to cover the charge port. A user opens the charge port door to permit coupling of the charger with the charge port during a charge. The user closes the charge port door after decoupling the charger from the charge port.

SUMMARY

A charge port covering assembly according to an exemplary aspect of the present disclosure includes, among other things, a biasing device configured to move to a first position when a charger is decoupled from a charge port, and to a second position when the charger is coupled to the charge port. A charge port door is moveable to a closed position when the biasing device is in the first position, and is held in an open position when the biasing device is in the second position.

In a further non-limiting embodiment of the foregoing assembly, the biasing device is a spring.

A further non-limiting embodiment of any of the foregoing assemblies includes a slideable member. The biasing device is coupled to the charge port door and the slideable member.

In a further non-limiting embodiment of any of the foregoing assemblies, the biasing device in the second position holds the charge port door in the open position.

In a further non-limiting embodiment of any of the foregoing assemblies, the slideable member is a pin.

In a further non-limiting embodiment of any of the foregoing assemblies, the slideable member is configured to slide from a retracted position to an extended position to move the biasing device from the first position to the second position.

A further non-limiting embodiment of any of the foregoing assemblies includes an actuator configured to move between activated position and a deactivated position. The actuator in the activated position is configured to move the slideable member from the retracted position to the extended position. The actuator in the deactivated position is configured to permit movement of the slideable member from the extended position to the retracted position.

In a further non-limiting embodiment of any of the foregoing assemblies, the biasing device is a first biasing device and the assembly further includes a second biasing device that biases the actuator toward the deactivated position.

A further non-limiting embodiment of any of the foregoing assemblies includes a first actuator member of the actuator and a second actuator member of the actuator. The second actuator member is moved when in the deactivated position to provide an open area for the first actuator member to fall downward and permit the slideable member to move to the retracted position.

A charge port covering method according to another exemplary non-limiting embodiment of the foregoing disclosure includes, among other things, biasing a charge port door toward an open position with a biasing device in a first position, and moving the biasing device from the first position to a second position to close the charge port door.

A further non-limiting embodiment of the foregoing method includes coupling a charger to a charge port to move the biasing device from the first position to the second position, and decoupling the charger from the charge port to move the biasing device from the second position to the first position.

A further non-limiting embodiment of any of the foregoing methods includes moving a slideable member to move the biasing device.

In a further non-limiting embodiment of any of the foregoing methods, the biasing device is coupled to the slideable member and the charge port door.

In a further non-limiting embodiment of any of the foregoing methods, the slideable member is configured to slide from a retracted position to an extended position to move the biasing device from the first position to the second position.

A further non-limiting embodiment of the foregoing methods includes applying the biasing using a spring.

A further non-limiting embodiment of any of the foregoing methods includes coupling a charger to a charge port to move an actuator to an activated position, and decoupling the charger from the charge port to move the actuator to a deactivated position. The moving of the actuator to the activated position moving the slideable member from the retracted position to the extended position. The moving of the actuator to the deactivated position permitting movement of the slideable member from the extended position to the retracted position.

In a further non-limiting embodiment of any of the foregoing methods, the biasing device is a first biasing device and the method further includes biasing the actuator toward the deactivated position using a second biasing device.

A further non-limiting embodiment of any of the foregoing methods includes coupling the charger to the charge port to overcome a biasing force applied by the second biasing device to the actuator. The biasing force applied by the second biasing device biasing the actuator toward the deactivated position.

A further non-limiting embodiment of any of the foregoing methods includes moving a first actuator member of the actuator and a second actuator member of the actuator when moving the actuator between the deactivated position and the activated position. The second actuator member moved when in the deactivated position to provide an open area for the first actuator member to fall downward and permit the slideable member to move to the retracted position.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates a section view through the charge port and the charge port door of FIG. 1.

FIG. 5 illustrates the flow of an exemplary method for covering the charge port of FIG. 1 with the charge port door.

DETAILED DESCRIPTION

This disclosure relates generally to covering a charge port of an electrified vehicle with a charge port door.

The charge port door can be opened by a user so that a charger can be coupled to the charge port to charge a traction battery of the electrified vehicle. After charging an electrified vehicle, the user decouples the charger from the charge port. The charge port door, according to an exemplary embodiment, closes automatically in response to decoupling the charger from the charge port. Accordingly, the charge port door will not inadvertently remain in an open position.

Figure 1:
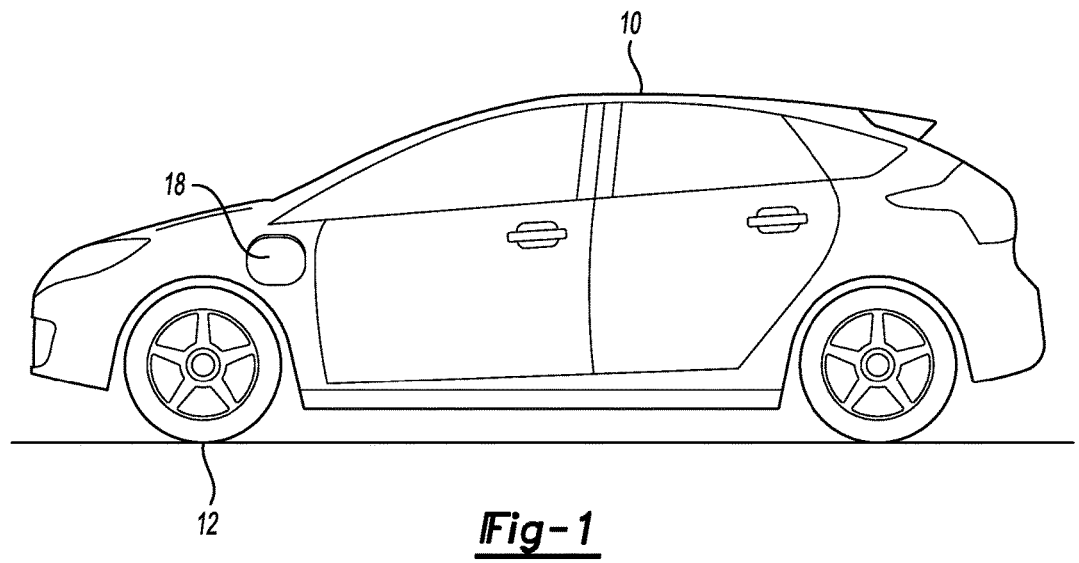
FIG. 1 illustrates a side view of an example electrified vehicle with a charge port covered by a charge port door in a closed position.
Figure 2:
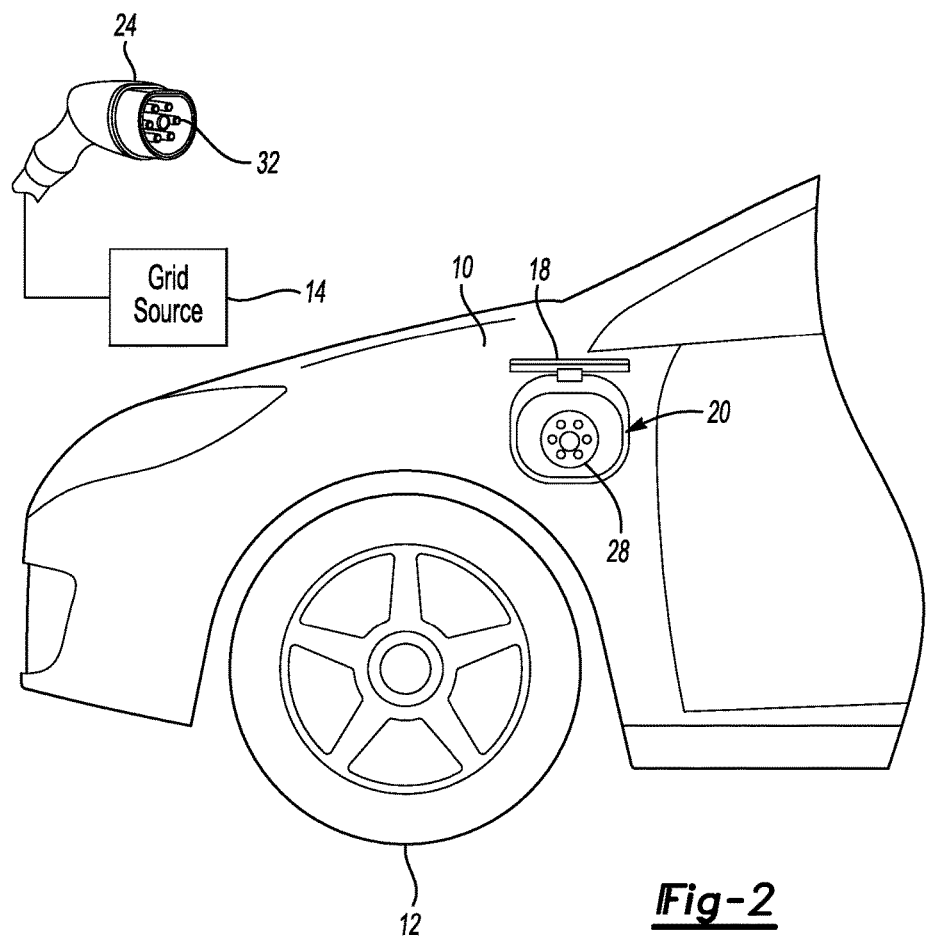
FIG. 2 illustrates a close-up view of the charge port of the electrified vehicle of FIG. 1 together with a charger and the charge port door in an open position.

Referring to FIGS. 1 and 2, an exemplary vehicle 10 is a plug-in hybrid electric vehicle (PHEV) that includes a traction battery. In another example, the vehicle 10 is a battery electric vehicle (BEV). Other vehicles that incorporate charge ports are included within the scope of this disclosure.

A power-split powertrain of the vehicle 10 employs a first drive system and a second drive system. The first and second drive systems generate torque to drive one or more sets of vehicle drive wheels 12. The first drive system can include a combination of an internal combustion engine and a generator. The second drive system can include at least a motor, the generator, and the traction battery.

From time to time, charging the traction battery is required or desirable. When the vehicle 10 is moving, power from regenerative braking can charge the traction battery. When the vehicle 10 is stationary, an external power source, such as a grid source 14, can be used to charge the traction battery.

The vehicle 10 includes a charge port door that, when in a closed position as shown in FIG. 1, covers a charge port 20 of the vehicle 10. The charge port 20 is an interface of the vehicle 10 that can connect to a charger 24. Electrical power from the grid source 14 communicates through the charger 24 to the charge port 20 to recharge the traction battery of the vehicle 10. The charger 24 can draw electrical power from the grid source 14 at, for example, a home of the operator, a public charging station, etc.

The exemplary charge port 20 is an AC charge port that receives AC power from the grid source 14. In another example, the charge port 20 is a DC charge port that receives DC power from the grid source 14. In yet another example, the charge port 20 is a combined AC/DC charge port that can receive AC power or DC power.

The charge port 20 includes electrical connectors 28 that electrically connect to corresponding electrical connectors 32 within the charger 24 when the charger 24 is coupled to the charge port 20. The charge port door 18, when closed, covers the electrical connectors 28, which can block inadvertent contact with the electrical connectors 28. The charge port door 18, when closed, can aesthetically enhance the vehicle 10 by concealing the charge port 20 from view.

Referring now to FIG. 3 with continuing reference to FIG. 2, the charge port door 18 is in the closed position when the charger 24 is not coupled to the charge port 20. The charge port door 18 is part of a charge port covering assembly. Due to the charge port covering assembly, the charge port door 18 automatically moves to the closed position of FIG. 3 when the charger 24 is decoupled from the charge port 20. That is, the charge port door 18, due to the charge port covering assembly, will not stay in the position of FIG. 2, but will instead automatically move to the position of FIG. 1 when the charger 24 is decoupled from the charge port 20. The movement to the closed position does not substantially require an interaction from a user beyond decoupling the charger 24 from the charge port 20.

The charge port door covering assembly includes the charge port door 18, a biasing device 40, a slideable member 44, and an actuator assembly 48. In this exemplary embodiment, the actuator assembly 48 of the charge port covering assembly includes a first actuator member 58, a second actuator member 62, and a biasing device 66.

Figure 4:
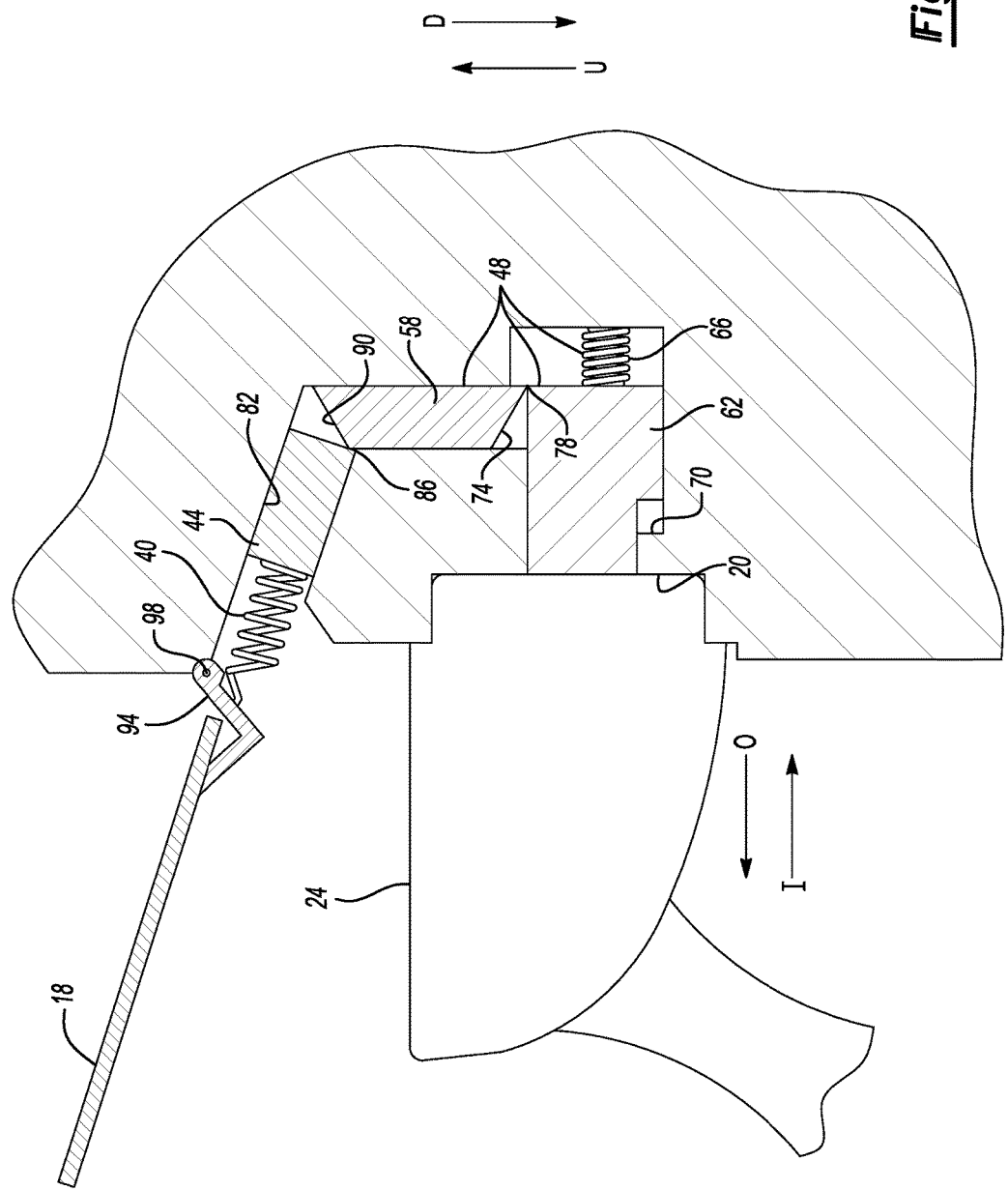
FIG. 4 illustrates the section view of FIG. 3 when the charge port door is in an open position and the charger is coupled to the charge port.

The actuator assembly 48 is moveable between a deactivated position of FIG. 3 and an activated position of FIG. 4. In the deactivated position, that actuator assembly 48 permits the charge port covering assembly to move and maintain the charge port door 18 in the closed position. In the activated position, the actuator assembly 48 permits the charge port covering assembly to maintain the charge port door 18 in the open position. As will be described, coupling the charger 24 to the charge port 20 causes the actuator assembly 48 to move from the deactivated position to the activated position, and decoupling the charge 24 from the charge port 20 causes the actuator assembly 48 to move from the activated position to the deactivated position.

In FIG. 3, the actuator assembly 48 is shown in a deactivated position where the second actuator member 62 is biased outward in a direction O toward the charge port door 18. A lip 70 prevents movement of the second actuator member to a position where the second actuator member 62 could contact the charge port door 18 in the closed position.

Biasing the second actuator member 62 outward toward the charge port door 18 in the closed position provides a first open area $A_1$. The first actuator member 58 falls downward in a direction D into the open area $A_1$ such that a portion of the first actuator member 58 is aft of the second actuator member 62. Downward, for purposes of this disclosure, is with reference to ground and a normal orientation of the vehicle 10 (FIG. 1) during a charge from an external source of power.

A tapered surface 74 of the first actuator member 58 contacts a corner region 78 of the second actuator member 62 to block further movement of the first actuator member 58 downward in the direction D.

With the first actuator member 58 moved downward, the slideable member 44 is able to slide within a slot 82 inward in the direction I to a retracted position. In the retracted position of this exemplary embodiment, a corner region 86 of the slideable member 44 rests against another tapered surface 90 of the first actuator member 58.

The biasing device 40 is a spring, such as a tension spring. One end of the biasing device is coupled to the charge port door 18 through a hinge member 94. Another, opposing end of the biasing device 40 is directly coupled to the slideable member 44.

The slideable member 44 moved inward in the direction I provides a second open area $A_2$ accommodates the biasing device 40. When accommodated within the second open area $A_2$, the biasing device 40 does not exert a biasing force on the charge port door 18 that could move the charge port door 18 to the open position. Instead, the biasing device 40 pulls and maintains the charge port door 18 to the closed position.

Movement of the actuator assembly 48 to the actuated position transitions the slideable member 44 from the retracted position of FIG. 3 to an extended position as shown in FIG. 4. In the extended position, the slideable member 44 slides within the slot 82 into the second open area $A_2$. The movement of the slideable member 44 moves the biasing device 40 causing the biasing device 40 to press against the hinge member 94 of the charge port door 18. The slideable member 44 in the extended position moves the biasing device 40 to a position that holds the charge port door 18 in the open position of FIG. 4. Maintaining the slideable member 44 in the extended position causes the biasing device 40 to continue biasing the hinge member 94 to maintain the charge port door 18 in the open position where the hinge member 94 is pivoted about a pivot member 98 to the open position of FIG. 4.

To initially move the charge port door 18 from the closed position of FIG. 3 to the open position of FIG. 4, an operator manually moves the charge port door 18 to open position. The operator can hold the charge port door 18 in the open position and then couple the charger 24 to the charge port 20.

The coupling of the charger 24 to the charge port 20 moves the charger 24 against the second actuator member 62 to slide the second actuator member 62 inward in a direction I. The forces associated with coupling the charger 24 to the charge port 20 are sufficient to overcome the biasing force provided by the biasing device 66.

As the second actuator member 62 moves in the direction I, the corner region 78 slides along the tapered surface 74 of the first actuator member 58, which moves the first actuator member 58 upwards in a direction U, which is opposite the direction D. Movement of the first actuator member 58 in the direction U slides the tapered surface 90 along the corner region 86 of the slideable member 44, which forces the slideable member 44 from the retracted position of FIG. 3 to the extended position of FIG. 4.

When the traction battery of the vehicle 10 is fully charged, the operator decouples the charger 24 from the charge port 20. The operator may choose to decouple the charger 24 from the charge port 20 at another time, such as when only a partial charge of the traction battery is desired.

Decoupling the charger 24 from the charge port 20 permits the biasing device 66 to force the second actuator member 62 of the actuator assembly 48 back outward in the direction O, until the second actuator member 62 contacts the lip 70 as shown in FIG. 3.

The outward movement of the second actuator member 62 reopens the area $A_1$ to permit the first actuator member 58 to fall downward in the direction D back to the position of FIG. 3. Since, after falling downward, the first actuator member 58 is no longer holding the slideable member 44 in the extended position, the slideable member 44 slides back to the retracted position of FIG. 3. Generally, the weight of the charge port door 18 forces the slideable member 44 to slide back to the retracted position. The weight of the charge port door 18 moves the slideable member 44 since the movement is no longer blocked by the first actuator member 58.

Referring to FIG. 5, an exemplary method 100 of covering a charge port includes opening a charge port door at a step 104. Next, at a step 108, a charger is coupled to the charge port to move a biasing device from a first position to second position. At a step 112, the biasing device in the second position holds open the charge port door.

Next, the charger is decoupled from the charge port at a step 116, which causes the biasing device to move from the second position back to the first position. At a step 120, the moving of the biasing device to the first position is used to close the charge port door.

Features of the disclosed examples include a charge port door that automatically closes when a charger is decoupled from a charge port. This can avoid the charge port door being left open inadvertently. Charge port doors, in contrast to typical fuel doors of conventional vehicles, can be opened and closed much more often. Thus, the chances for inadvertently leaving a charge port door open can be greater than the chances for leaving such a typical fuel door open. Further, electrified vehicles typically can have their chargers engaged to a charge port by an operator that is someone other than a driver of the vehicle, such as a worker at a public electrical charge distribution center.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charge port covering assembly, comprising:
   a first biasing device configured to move to a first position when a charger is decoupled from a charge port, and to a second position when the charger is coupled to the charge port;
   a charge port door that is moveable to a closed position when the first biasing device is in the first position, the first biasing device in the second position holding the charge port door in the open position;
   a slideable member configured to slide from a retracted position to an extended position to move the first biasing device from the first position to the second position;
   an actuator configured to move between activated position and a deactivated position, the actuator including a first actuator member and a second actuator member, the actuator in the activated position configured to move the slideable member from the retracted position to the extended position, the actuator in the deactivated position configured to permit movement of the slideable member from the extended position to the retracted position,
   wherein the second actuator member is moved when in the deactivated position to provide an open area for the first actuator member to fall downward and permit the slideable member to move to the retracted position; and
   a second biasing device that biases the actuator toward the deactivated position.

2. The charge port covering assembly of claim 1, wherein the first biasing device is a spring.

3. The charge port covering assembly of claim 1, wherein the first biasing device is coupled to both the charge port door and the slideable member.

4. The charge port covering assembly of claim 3, wherein the slideable member is a pin.

5. A charge port covering method, comprising:
biasing a charge port door toward an open position with a first biasing device in a first position;
moving a slideable member to move the first biasing device from the first position to a second position to close the charge port door, wherein the first biasing device moves from the first position to the second position in response to a coupling of a charger to a charge port, wherein the first biasing device moves from the second position to the first position in response to a decoupling of the charger from the charge port;
coupling the charger to the charge port to move an actuator to an activated position, and decoupling the charger from the charge port to move the actuator to a deactivated position, wherein the actuator includes a first actuator member and a second actuator member, wherein the second actuator member is moved when in the deactivated position to provide an open area for the first actuator member to fall downward and permit the slideable member to move to the retracted position, wherein the moving of the actuator to the activated position moves the slideable member from the retracted position to the extended position, and the moving of the actuator to the deactivated position permits movement of the slideable member from the extended position to the retracted position; and
biasing the actuator toward the deactivated position using a second biasing device, wherein coupling the charger to the charge port overcomes a biasing force applied by the second biasing device, the biasing force applied by the second biasing device biasing the actuator toward the deactivated position.

6. The charge port covering method of claim 5, wherein the first biasing device is coupled to the slideable member and the charge port door.

7. The charge port covering method of claim 5, wherein the slideable member is configured to slide from the retracted position to the extended position to move the biasing device from the first position to the second position.

8. The charge port covering method of claim 7, further comprising applying the biasing using a spring.

9. A charge port covering assembly, comprising:
a first biasing device configured to move to a first position when a charger is decoupled from a charge port, and to a second position when the charger is coupled to the charge port;
a charge port door that is moveable to a closed position when the biasing device is in the first position, the biasing device in the second position holding the charge port door in the open position;
a slideable member configured to slide from a retracted position to an extended position to move the first biasing device from the first position to the second position;
an actuator configured to move from a deactivated position to an activated position to move the slideable member from the retracted position to the extended position, the actuator further configured to move from the activated position to the deactivated position to permit movement of the slideable member from the extended position to the retracted position, wherein the actuator includes first actuator member and a second actuator member, the second actuator member moved when in the deactivated position to provide an open area for the first actuator member to fall downward and permit the slideable member to move to the retracted position; and
a second biasing device that biases the actuator toward the deactivated position.

* * * * *